United States Patent [19]

Leonberger

[11] Patent Number: 5,563,741

[45] Date of Patent: Oct. 8, 1996

[54] EXTERIOR REARVIEW MIRROR FOR MOTOR VEHICLES

[75] Inventor: Karl-Heinz Leonberger, Hochdorf, Germany

[73] Assignee: Reitter & Schefenacker GmbH & Co. KG, Esslingen, Germany

[21] Appl. No.: 297,310

[22] Filed: Aug. 26, 1994

[30] Foreign Application Priority Data

Aug. 28, 1993 [DE] Germany ............................ 43 28 994.0

[51] Int. Cl.⁶ .............................. G02B 7/182; B60R 1/06
[52] U.S. Cl. ...................... 359/841; 359/872; 248/479
[58] Field of Search .................................. 359/841, 843, 359/872; 248/476, 479

[56] References Cited

U.S. PATENT DOCUMENTS

| | | |
|---|---|---|
| 2,607,273 | 8/1952 | Lark ............................................ 359/841 |
| 3,468,218 | 9/1969 | Schimmelpfennig ................... 359/841 |
| 4,911,545 | 3/1990 | Miller . | |

FOREIGN PATENT DOCUMENTS

| | | |
|---|---|---|
| 0297284 | 1/1989 | European Pat. Off. . |
| 2225023 | 5/1972 | Germany . |
| 3939807 | 6/1991 | Germany . |
| 0004440 | 1/1982 | Japan ............................... 359/841 |
| 0194640 | 11/1983 | Japan ............................... 359/841 |
| 0179350 | 9/1985 | Japan ............................... 359/841 |
| 0150850 | 7/1986 | Japan ............................... 359/841 |
| 0146654 | 7/1986 | Japan ............................... 359/841 |
| 550082 | 9/1972 | Switzerland . |
| 0911251 | 11/1962 | United Kingdom ................. 359/841 |

Primary Examiner—Ricky D. Shafer
Attorney, Agent, or Firm—Robert W. Becker & Associates

[57] ABSTRACT

An exterior rearview mirror for motor vehicles has a support member for connecting the rearview mirror to the motor vehicle. A mirror housing is connected to the support member and has a mirror support connected inside the mirror housing. The mirror support has a frontal opening for a mirror. The mirror housing together with the mirror support is pivotable relative to the support member from a position of use into a rest position. The support member is hollow and has a receiving element extending into the interior of the motor vehicle. In the rest position the mirror housing together with the mirror support is substantially folded into the support member.

22 Claims, 4 Drawing Sheets

5,563,741

EXTERIOR REARVIEW MIRROR FOR MOTOR VEHICLES

BACKGROUND OF THE INVENTION

The present invention relates to an exterior rearview mirror for vehicles, especially motor vehicles, comprising a support member extending outwardly from the vehicle and a mirror housing in which a mirror support is provided whereby the mirror housing is pivotable relative to the support member from a position.

An exterior rearview mirror of the aforementioned kind is known from Swiss patent 550 082 wherein the support member is in the form of a pivot arm that at its free end carries the mirror housing. The support member or pivot arm is comprised of a plurality of parts and operates in a telescopic manner. In the telescopically folded state the mirror housing is still pivotable relative to the support member. This exterior rearview mirror fulfills the requirements of the so-called pendulum impact test according to European Community regulations for exterior rearview mirrors, however, it is constructively very complicated and thus very expensive to manufacture.

Another exterior rearview mirror is known from German Patent 39 39 807 in which the support member is completely integrated into the interior of the motor vehicle and into which the mirror housing can be retracted with a drive motor when the spatial circumstances require this action. The mirror housing however is not pivotable relative to the support member when the mirror housing encounters an obstacle.

The sidewall of the mirror housing can be comprised of two plates that are coupled with one another and which allow a folding of one part of the mirror housing upon impact. This exterior rearview mirror does not fulfill the corresponding European Community testing requirements for exterior rearview mirrors.

It is therefore an object of the present invention to improve an exterior rearview mirror of the aforementioned kind such that it fulfills the test requirements of the so-called pendulum impact test according to European Community testing requirements, which however is a constructively simple design and can be manufactured inexpensively.

SUMMARY OF THE INVENTION

The exterior rearview mirror for a motor vehicle according to the present invention is primarily characterized by:

A support member for connecting the rearview mirror to the motor vehicle;

A mirror housing connected to the support member;

The mirror housing comprising a mirror support connected inside the mirror housing, the mirror support having a frontal opening for a mirror;

The mirror housing together with the mirror support pivotable relative to the support member from a position of use into a rest position;

The support member being hollow and having a receiving element extending into the interior of the motor vehicle; and The mirror housing together with the mirror support, in the rest position, substantially folded into the support member.

Preferably, the receiving element is substantially pocket-shaped.

Advantageously, the mirror housing is connected to the support member such that the mirror housing is pivotable about an upwardly extending pivot axis. Preferably, the mirror support has a sidewall positioned adjacent to the motor vehicle in the position of use wherein the pivot axis is in the vicinity of the sidewall.

In a preferred embodiment of the present invention, the support member comprises two legs projecting transverse to a direction of travel of the motor vehicle, the two legs spaced apart and receiving therebetween the mirror housing. Preferably, the pivot axis in this embodiment extends through the two legs.

Expediently, the pivot axis is located in the vicinity of the frontal opening of the mirror support.

In another embodiment of the present invention, the rearview mirror further comprises at least one abutment for limiting a pivot movement of the mirror housing into the rest position. The at least one abutment is preferably provided at the mirror housing and is in the form of an outwardly projecting edge around the frontal opening of the mirror support.

Advantageously, the mirror housing and the mirror support form a unitary part. Preferably, in the position of use, the outwardly projecting edge rests at an edge of the support member.

In a preferred embodiment of the present invention, the receiving element in a side view is substantially triangular and preferably in horizontal section is also substantially triangular.

Expediently, the rearview mirror further comprises a plate-shaped fastening element for connecting the support member to the motor vehicle. Preferably, the receiving element extends over the entire height of the fastening element.

Advantageously, the outer contour of the receiving element matches the outer contour of the mirror housing.

In yet another embodiment of the present invention, the rearwall of the mirror housing is curved in a longitudinal direction and in the direction of the height of the mirror housing. Preferably, the radius of curvature of the rearwall in horizontal section is greater than a pivot radius of the mirror housing.

According to the present invention, the mirror housing can be folded into the support member and its receiving element when a respective impact is exerted onto the mirror housing. Since within the interior of the motor vehicle a receiving element is positioned adjacent to the support member, the support member can be of a compact design so that it only projects to a small extent outwardly from the motor vehicle. On the other hand, the receiving element can also be of a compact design since it must receive only a portion of the mirror housing. Thus, the receiving element does not project into the interior of the motor vehicle. The inventive exterior rearview mirror fulfills the corresponding European Community testing requirements. Due to the inventive embodiment the exterior rearview mirror has a constructively simple embodiment and can thus be manufactured inexpensively.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 4.

Figure 2:
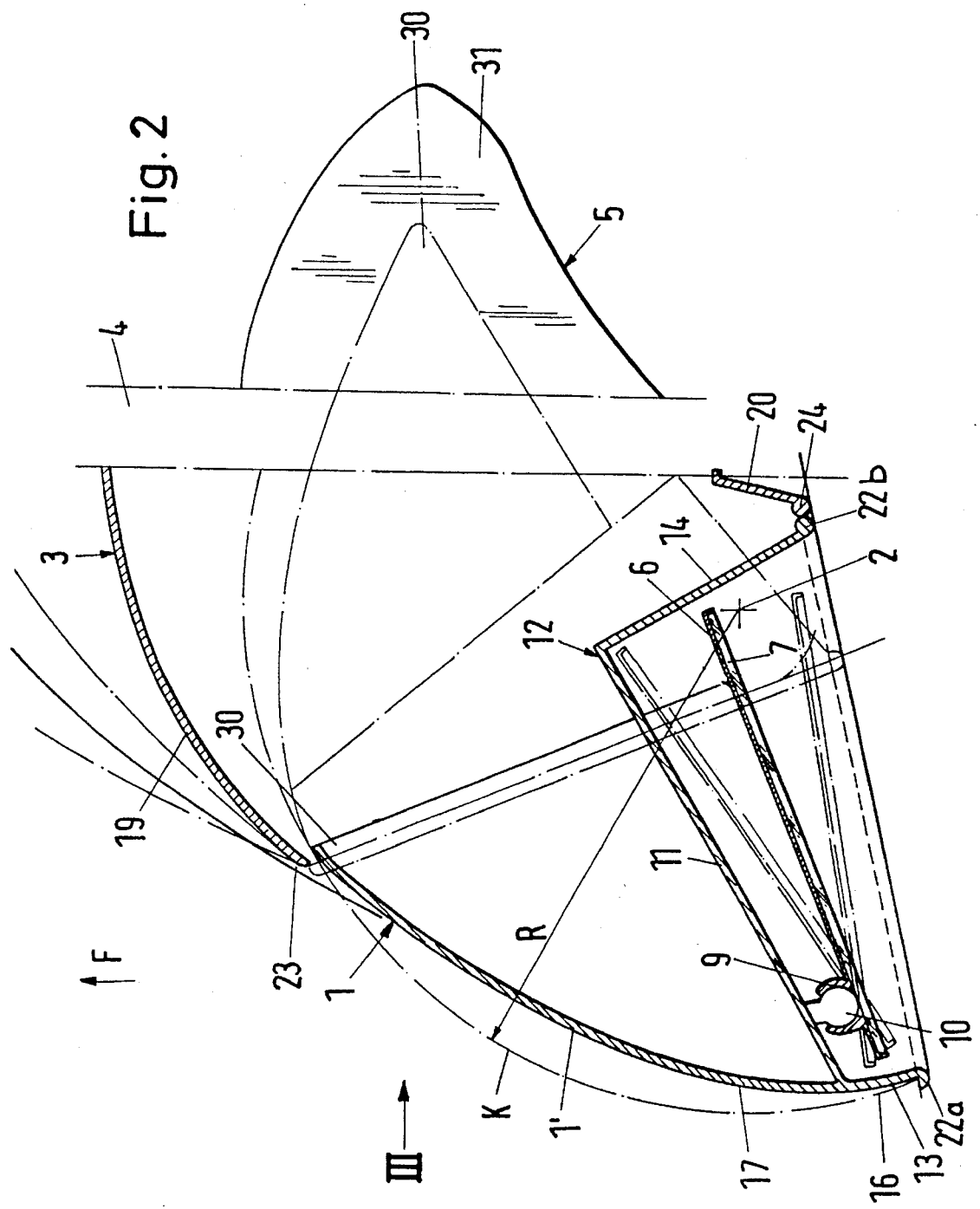
FIG. 2 shows partially in horizontal section and partially in an end view the mirror according to FIG. 1 in an enlarged representation.
Figure 3:
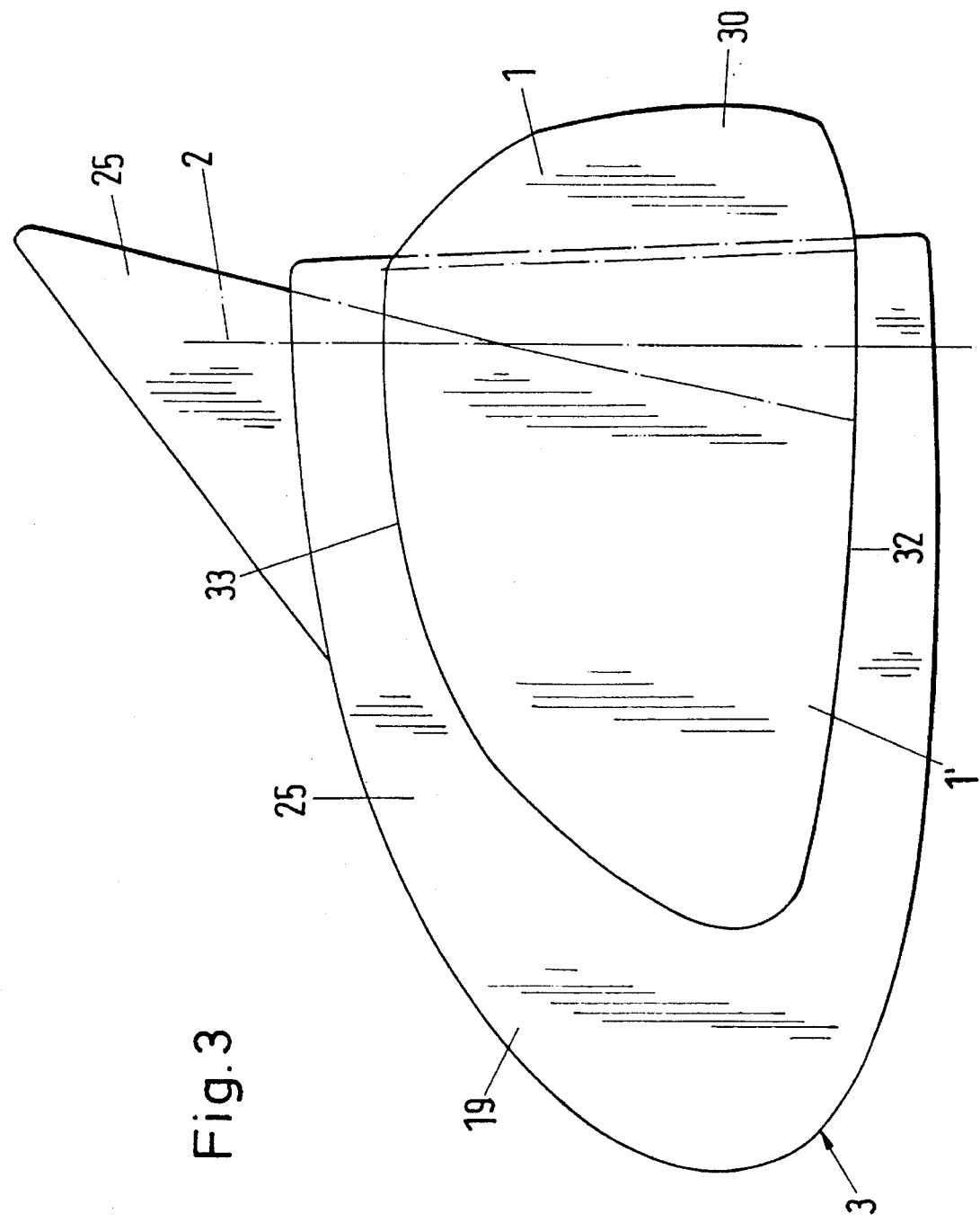
FIG. 3 shows a view in direction of arrow III of FIG. 2.
Figure 4:
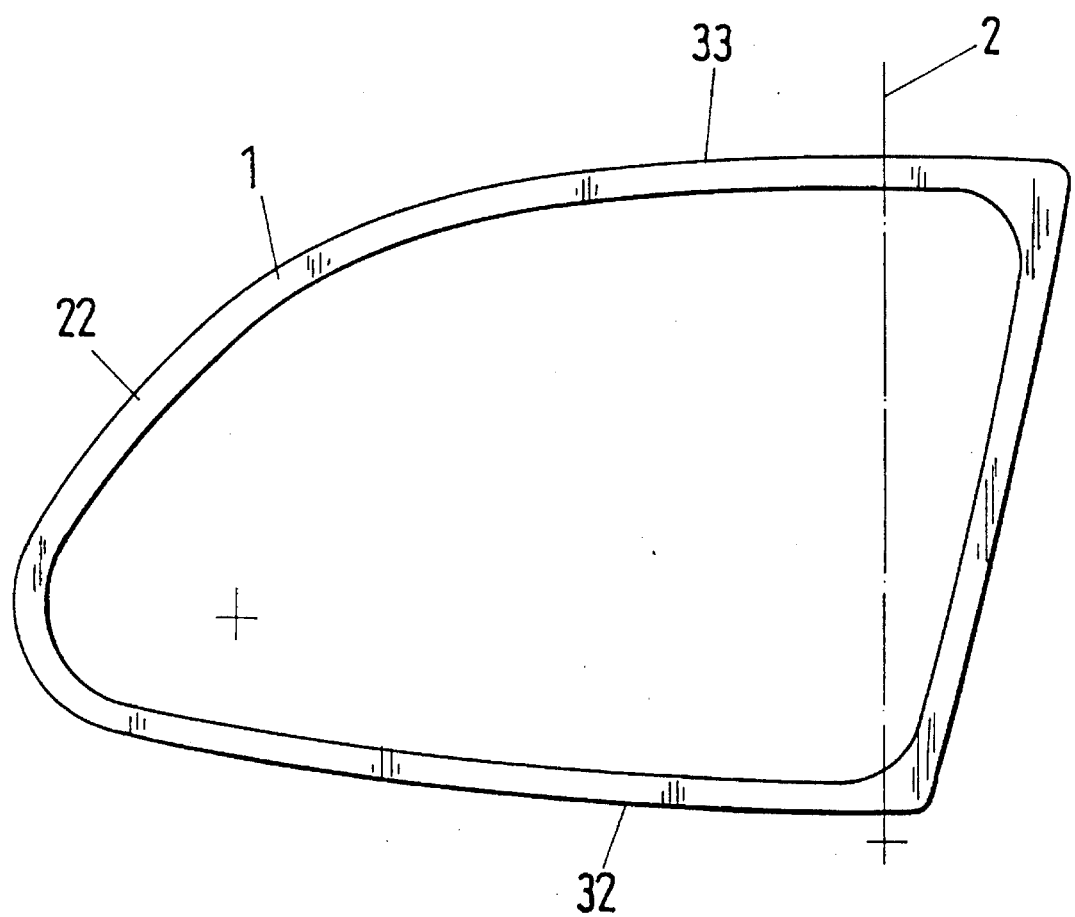
FIG. 4 shows the mirror housing of FIG. 1 in a frontal view.

The exterior rearview mirror represented in FIGS. 1 to 4 has a mirror housing 1 that is represented in detail in FIG. 4. The mirror housing 1 is connected to the support member 3 and is pivotable about a pivot axis 2. The support member 3 is connected to the door frame 4 of a non-represented motor vehicle.

The mirror housing 1 and the mirror support 12 are formed as a unitary part (FIG. 2). Within the mirror support 12 a pivotable mirror glass holder 6 is arranged which is pivotable in all directions. The holder 6 supports the mirror glass 7 and at its back side is provided with a bearing cup 9 in which a ball joint 10 is located. The ball joint 10 is connected to the backwall 11 of the mirror support 12 and is preferably a unitary part thereof. The pivot joint 9, 10 is positioned at a relatively small distance to the sidewall 13 of the mirror support 12. This sidewall 13 has a transition into the rearwall 1' of the cup-shaped mirror housing 1. The sidewall 13 is multiple times shorter than the oppositely arranged sidewall 14 of the mirror support 12 facing the support member 3. Both sidewalls 13, 14 are positioned at an obtuse angle relative to the backwall 11 of the mirror support 12 which angle is only slightly greater than 90°.

The exterior 16 of the sidewall 13 is curved corresponding to the exterior 17 of the rearwall 1', when viewed in cross-section, so as to be arc-shaped. The free edge 22a of the sidewall 13 is outwardly curved and forms an abutment with which the mirror housing 1 upon completion of the pivot movement rests at the edge 23 of the support member 3.

The peripheral edge 22b of the sidewall 14 of frontal opening of the mirror support 12 in the position of use (FIG. 2) of the mirror housing 1 rests at the neighboring edge 24 of an upwardly extending sidewall 20 (see FIG. 1) of the support member 3.

Adjacent to the sidewall 20 of the support member 3 a bottom leg 26 and a top leg 27 extend substantially at a right angle (FIG. 1) which have a back wall 19 as a transition into one another (FIGS. 2 and 3). The bottom leg 26 is shorter than the top leg 27. Thus, the support member 3 widens in the direction of travel F toward the front of the vehicle. The rearwall 1' of the mirror housing 1 extends only over a portion of the length of the mirror support 12 (FIG. 2) which has a bottom 32 and a cover 33 (FIG. 4). The bottom 32 and the cover 33 connect the sidewalls 13, 14 and the backwall 11 of the mirror support 12 to one another. The rearwall 1' of the mirror housing 1 is curved in the longitudinal direction as well as in the direction of its height so that the mirror housing 1 has an aerodynamic design. The edge 22 of the mirror support 12 surrounds the frontal opening of the mirror support 12 (FIG. 4). The opening tapers outwardly from the door frame 4 of the motor vehicle.

The bottom 32 and the cover 33 of the mirror support 12 each have a non-represented pivot that engages a corresponding non-represented bearing opening at the bottom leg 26 and the top leg 27 of the support member 3. With the pivots provided at the mirror support 12 the pivot axis 2 (FIG. 1 to FIG. 4) about which the mirror housing 1 is pivotable relative to the support member 3 is defined. The pivot axis 2 extends upwardly and is positioned, as shown in FIG. 2, at a small distance from the sidewall 14 and from the frontal opening of the mirror support 12.

In the position of use (FIG. 2) the mirror housing 1 is substantially completely pivoted out of the housing-like support member 3. The mirror housing 1 and the support member 3 overlap one another only to such an extent that the inventive exterior rearview mirror has a substantially closed rear wall. The mirror housing 1 may be locked in the position of use at the support member 3 in order to ensure a safe and reliable position of operation.

The mirror housing 1 can be folded into the support member 3 by pivoting about the pivot axis 2. During pivoting the edge 22 of the mirror housing 1, respectively, of the frontal opening of the mirror support 12, moves along the dash-dotted line in FIG. 2 (indicated at K) about the pivot axis 2. In its folded rest position, the mirror housing 1 rests with the edge 22 over a portion of its circumference at the edge 24 of the support member 3 (dash-dotted lines in FIG. 2). This ensures a defined end position (rest position) of the mirror housing 1. With the outwardly bent edge 22 the mirror housing 1 can be comfortably pivoted outwardly into the position of use. The sidewall 20 of the support member 3 extends at an acute angle relative to the sidewall 14 of the mirror support 12 when in the position of use (FIG. 2). In a section vertical to the pivot axis 2 the housing rearwall 1' has a radius of curvature which is greater than the radius of pivoting R measured between the pivot axis 2 and the forward and rearward edges 22 and 21 of the housing rearwall 1' (viewed in the pivoting direction).

Figure 1:
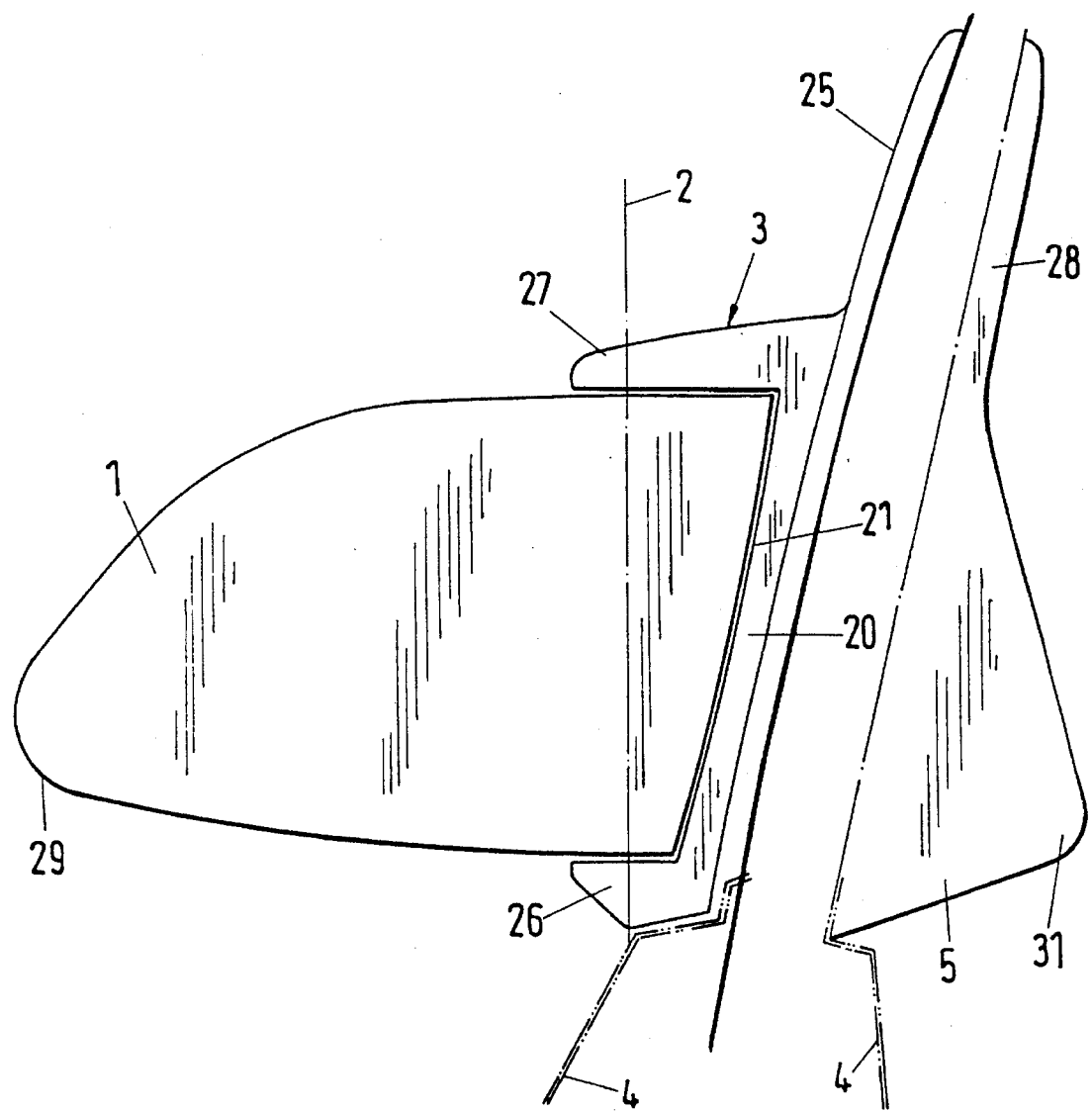
FIG. 1 shows an inventive exterior rearview mirror with a mirror housing and a support member connected to a motor vehicle.

In order for the support member 3 not to project too far from the door frame 4, while still ensuring that the mirror housing 1 can be folded into the support member 3, the support member 3 comprises a pocket-shaped receiving element 5 that projects from the door frame 4 inwardly. In it the mirror housing 1 is located when in the folded rest position (dash-dotted lines in FIG. 2). The support member 3 is connected to the door frame 4 with an attachment element 25 in the form of a substantially triangular plate. The support member 3 projects outwardly from this attachment element 25 and is substantially cup-shaped as the mirror housing 1. The attachment element 25 projects past the support member 3 in the upward direction with its upper corner. In a side view according to FIG. 1 the support member 3 has a substantially U-shaped contour with a bottom leg 26 and a top leg 27 which project substantially perpendicular from the fastening element 25 and receive therebetween the mirror housing 1 at the respective underside and upper side. The top leg 27 is approximately twice as long as the bottom leg 26. The transverse stay of the U-shaped contour is formed by the sidewall 20 which extends parallel to the attachment element 25 and is preferably a unitary part thereof. The receiving element 5 can also be a unitary part of the attachment element 25. However, it is also possible to provide the receiving element as a separate part. The receiving element 5 has the same height as the attachment element 25 (FIG. 1). In the upper area 28 the receiving element 5 is formed flatter than at its lower area. The receiving element 5 has, as can be seen in FIG. 1, in a side view substantially a triangular contour. Approximately at the height of the outwardly and lower rounded corners 29 of the mirror housing 1 (FIG. 1) the receiving element 5 has its greatest depth. As shown in FIG. 2, the receiving element 5 in horizontal section has a substantially triangular contour. The exterior contour of the receiving element 5 is preferably matched to the shape of the mirror housing 1 so that the receiving element 5 requires only small dimensions and thus does not project into the interior of the motor vehicle. In the folded position the mirror housing 1 extends with the corner 30 that is facing away from the sidewall 20 of the support member 3 into the corresponding corner 31 of the receiving element 5 which is farthest inwardly positioned within the motor vehicle.

The support member 3 has an end face 19 which is curved in the direction of height and transverse to the direction of travel F (FIG. 2). The end face 19 extends rearwardly from the door frame 4, respectively, from the attachment element 25 in the direction of travel F. Due to the described embodiment the support member 3 is also aerodynamically shaped.

In an alternative embodiment to the aforedescribed design, the pivots can also be provided at the bottom leg 26 and the top leg 27 of the support member 3, and the pivots then engage corresponding bearing openings provided at the mirror housing 1.

The mirror housing 1 closes off in each position the outward opening of the support member 3 so that even in the rest position the exterior rearview mirror is essentially completely closed. Thus there is no possibility to introduce any foreign material into the support member 3 which could result in impeding or destroying the function of the exterior rearview mirror.

The present invention is, of course, in no way restricted to the specific disclosure of the specification and drawings, but also encompasses any modifications within the scope of the appended claims.

What I claim is:

1. An exterior rearview mirror for a motor vehicle, said exterior rearview mirror comprising:

a support member for connecting said rearview mirror to the motor vehicle;

a mirror housing connected to said support member;

said mirror housing comprising a mirror support connected inside said mirror housing, said mirror support having a frontal opening for a mirror;

said mirror housing together with said mirror support pivotable about an upright pivot axis relative to said support member from a position of use into a rest position;

said support member being hollow and comprising a receiving element extending into the interior of the motor vehicle;

said support member having an outward opening facing said mirror housing in said position of use, said outward opening being closed by said mirror housing in said position of use; and said mirror housing together with said mirror support, in said rest position, stowed in said support member and said receiving element, wherein said mirror housing is connected to said support member such that said mirror housing is pivotable about an upwardly extending pivot axis and wherein said support member comprises two legs projecting transverse to a direction of travel of the motor vehicle, said two legs spaced apart and receiving therebetween said mirror housing.

2. A rearview mirror according to claim 1, wherein said receiving element is substantially pocket-shaped.

3. A rearview mirror according to claim 1, wherein said mirror support has a sidewall positioned adjacent to the motor vehicle in said position of use and wherein said pivot axis is in the vicinity of said sidewall.

4. A rearview mirror according to claim 1, wherein said pivot axis extends through said two legs.

5. A rearview mirror according to claim 1, wherein said pivot axis is located in the vicinity of said frontal opening of said mirror support.

6. A rearview mirror according to claim 1, further comprising at least one abutment for limiting a pivot movement of said mirror housing into said rest position.

7. A rearview mirror according to claim 6, wherein said at least one abutment is provided at said mirror housing.

8. A rearview mirror according to claim 7, wherein said abutment is an outwardly projecting edge around said frontal opening of said mirror support.

9. A rearview mirror according to claim 8, wherein said mirror housing and said mirror support form a unitary part.

10. A rearview mirror according to claim 8, wherein in said position of use, said outwardly projecting edge rests at an edge of said support member.

11. A rearview mirror according to claim 1, wherein said receiving element in a side view is substantially triangular.

12. A rearview mirror according to claim 1, wherein said receiving element in horizontal section is substantially triangular.

13. A rearview mirror according to claim 12, wherein said receiving element in a side view is substantially triangular.

14. A rearview mirror according to claim 1, further comprising a plate-shaped fastening element for connecting said support member to the motor vehicle.

15. A rearview mirror according to claim 14, wherein said receiving element extends over the entire height of said fastening element.

16. A rearview mirror according to claim 14, wherein said support member, said receiving element, and said fastening element form a unitary part.

17. A rearview mirror according to claim 1, wherein an outer contour of said receiving element matches an outer contour of said mirror housing.

18. A rearview mirror according to claim 1, wherein a rear wall of said mirror housing is curved in a longitudinal direction and is in the direction of the height of said mirror housing.

19. A rearview mirror according to claim 18, wherein a radius of curvature of said rear wall in a horizontal section is greater than a pivot radius of said mirror housing.

20. A rearview mirror according to claim 1, wherein said support member and said receiving element form a unitary part.

21. A rearview mirror according to claim 1, wherein said support member and said receiving element are two separate parts.

22. An exterior rearview mirror for a motor vehicle, said exterior rearview mirror comprising:

a support member for connecting said rearview mirror to the motor vehicle;

a mirror housing connected to said support member;

said mirror housing comprising a mirror support connected inside said mirror housing, said mirror support having a frontal opening for a mirror;

said mirror housing together with said mirror support pivotable relative to said support member from a position of use into a rest position;

said support member being hollow and comprising a receiving element extending into the interior of the motor vehicle;

said mirror housing together with said mirror support, in said rest position, stowed in said support member and said receiving element;

wherein said mirror housing is connected to said support member such that said mirror housing is pivotable about an upwardly extending pivot axis;

wherein said support member comprises two legs projecting transverse to a direction of travel of the motor vehicle, said two legs spaced apart and receiving therebetween said mirror housing; and wherein said pivot axis extends through said two legs.

* * * * *